United States Patent
Weidner et al.

(10) Patent No.: US 12,481,783 B2
(45) Date of Patent: Nov. 25, 2025

(54) SENSITIVE DATA CLASSIFICATION IN NON-RELATIONAL DATABASES

(71) Applicant: INTERNATIONAL BUSINESS MACHINES CORPORATION, Armonk, NY (US)

(72) Inventors: Glenn Weidner, Gilroy, CA (US); Krishnaswamy Sundaramurthy, San Jose, CA (US); Shraddha Baliram Kannav, San Jose, CA (US); Haeri Kim, San Francisco, CA (US); Ngan Tran, San Jose, CA (US); Shashi Kumar Nanjaiah, Sacramento, CA (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 17/304,286

(22) Filed: Jun. 17, 2021

(65) Prior Publication Data
US 2022/0405417 A1    Dec. 22, 2022

(51) Int. Cl.
*G06F 21/62* (2013.01)
*G06F 16/22* (2019.01)
(Continued)

(52) U.S. Cl.
CPC ...... *G06F 21/6245* (2013.01); *G06F 16/2282* (2019.01); *G06F 16/24573* (2019.01); *G06F 16/278* (2019.01)

(58) Field of Classification Search
CPC ............ G06F 21/6245; G06F 16/2282; G06F 16/24573; G06F 16/278
See application file for complete search history.

(56) References Cited

U.S. PATENT DOCUMENTS

| 5,379,419 A | 1/1995 | Heffernan |
| 8,914,322 B2 | 12/2014 | Arrouye |
| (Continued) | | |

FOREIGN PATENT DOCUMENTS

| CN | 1780352 A | * | 5/2006 | ........ H04M 1/72522 |
| CN | 103729428 A | * | 4/2014 | ........... G06F 16/353 |
| (Continued) | | | | |

OTHER PUBLICATIONS

CDATA JDBC Driver for MongoDB—Automatic Schema Discovery, http://cdn.cdata.com/help/DGB/jdbc/pg_AutomaticDiscovery.htm.

(Continued)

*Primary Examiner* — Ali S Abyaneh
*Assistant Examiner* — Lydia L Noel
(74) *Attorney, Agent, or Firm* — Stosch Sabo

(57) ABSTRACT

A method, a computer program product, and a system for detecting sensitive information in a non-relational database. The method includes partitioning a non-relational database into a plurality of partitions that are based characteristics relating to the non-relational database. The method also includes analyzing, by proceeding in an iterative manner with a first partition from the plurality of partitions, detecting a plurality of documents within the first partition containing metadata and data values, populating a table with the metadata representing fields and the data values relating to the metadata representing records, detecting sensitive information in the table, and recording the sensitive information. The method further includes proceeding with a second partition acting as a next entry for a next iteration, until all partitions in the plurality of partitions are analyzed, and reporting the sensitive information gathered from the partitions.

18 Claims, 5 Drawing Sheets

(51) Int. Cl.
*G06F 16/2457* (2019.01)
*G06F 16/27* (2019.01)

(56) References Cited

U.S. PATENT DOCUMENTS

| | | | |
|---|---|---|---|
| 9,558,239 | B2 | 1/2017 | Kaufmann |
| 9,892,151 | B2 | 2/2018 | Vuksan |
| 10,489,355 | B1 | 11/2019 | Messmer |
| 10,515,212 | B1 * | 12/2019 | McClintock ............ G06F 21/57 |
| 2009/0154815 | A1 * | 6/2009 | Fujiwara ................ H04N 1/444 |
| | | | 382/229 |
| 2010/0082417 | A1 * | 4/2010 | Wu ...................... G06Q 20/102 |
| | | | 705/14.18 |
| 2011/0119613 | A1 | 5/2011 | Zhu |
| 2019/0121819 | A1 * | 4/2019 | Garlapati .............. G06F 16/284 |
| 2020/0183939 | A1 | 6/2020 | Lashmet |
| 2020/0272734 | A1 | 8/2020 | Tora |
| 2020/0409795 | A1 * | 12/2020 | Lim ..................... G06F 9/45558 |
| 2021/0056219 | A1 * | 2/2021 | Sofer ................... G06F 16/2282 |
| 2021/0090694 | A1 * | 3/2021 | Colley .................. G16H 15/00 |
| 2021/0134265 | A1 * | 5/2021 | Rafferty ................ G06F 40/279 |
| 2021/0406319 | A1 * | 12/2021 | Holt ....................... G06F 16/93 |

FOREIGN PATENT DOCUMENTS

| | | | |
|---|---|---|---|
| CN | 107451190 A | | 12/2017 |
| CN | 108595490 A | * | 9/2018 |
| CN | 111010336 A | * | 4/2020 |
| WO | WO-2014205839 A1 | * | 12/2014 ............ H04L 67/06 |

OTHER PUBLICATIONS

Data classification (Part 1)—Overview, guardiumnotes, Guardium solutions technical articles, https://guardiumnotes.wordpress.com/2015/12/08/data-classification-part-1/.

Data classification (Part 2)—Classification policy rules, guardiumnotes, Guardium solutions technical articles, https://guardiumnotes.wordpress.com/2015/12/10/data-classification-part-2/.

IBM Security Guardium 11.2—Discover-Classification, https://www.IBM.com/support/knowledgecenter/SSMPHH_11.2.0/com.ibm.guardium.doc/discover/classification.html.

IBM Security Guardium 11.2—Discover-Sensitive Data, https://www.IBM.com/support/knowledgecenter/SSMPHH_11.2.0/com.ibm.guardium.doc/discover/discover_sensitive_data.html.

Using Range Queries, https://docs.mongodb.com/manual/reference/method/cursor.skip/#using-range-queries.

* cited by examiner

SENSITIVE DATA CLASSIFICATION IN NON-RELATIONAL DATABASES

BACKGROUND

The present disclosure relates to sensitive data classification, and more specifically, to classifying sensitive data stored in non-relational databases with potential memory limitations.

A database is an organized collection of information, or data, typically stored electronically in a computer system. In general, databases can be either a relational database or a non-relational database. Relational databases use a structure (e.g., a table) that allows users to identify and access data in a relation to other pieces of data in the database. Non-relational databases do not use a tabular scheme of rows and columns found in relational databases. Instead, non-relational databases use a storage model that is optimized for specific requirements of the type of data being stored.

Sensitive data, or sensitive information, can be viewed as data that may be required to be protected from being accessed by unauthorized parties. This is done to safeguard the security and the privacy of an individual or organization. Sensitive data can include personal information, business information, and classified information.

SUMMARY

Embodiments of the present disclosure include a computer-implemented method of detecting sensitive information in a non-relational database. The computer-implemented method includes partitioning a non-relational database into a plurality of partitions that are based characteristics relating to the non-relational database. The computer-implemented method also includes analyzing, by proceeding in an iterative manner with a first partition from the plurality of partitions, detecting a plurality of documents within the first partition containing metadata and data values, populating a table with the metadata representing fields and the data values relating to the metadata representing records, detecting sensitive information in the table, and recording the sensitive information. The computer-implemented method further includes proceeding with a second partition acting as a next entry for a next iteration until all partitions in the plurality of partitions are analyzed and reporting the sensitive information gathered from the partitions.

Additional embodiments of the present disclosure include a computer program product of detecting sensitive information in a non-relational database, one or more computer-readable storage medium, and program instructions stored on the one or more computer-readable storage media, the program instruction executable by a processor to cause the processor to perform a method. The method includes partitioning a non-relational database into a plurality of partitions that are based characteristics relating to the non-relational database. The method also includes analyzing, by proceeding in an iterative manner with a first partition from the plurality of partitions, detecting a plurality of documents within the first partition containing metadata and data values, populating a table with the metadata representing fields and the data values relating to the metadata representing records, detecting sensitive information in the table, and recording the sensitive information. The method further includes proceeding with a second partition acting as a next entry for a next iteration until all partitions in the plurality of partitions are analyzed and reporting the sensitive information gathered from the partitions.

Further embodiments of the present disclosure include a system for detecting sensitive information in a non-relational database. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
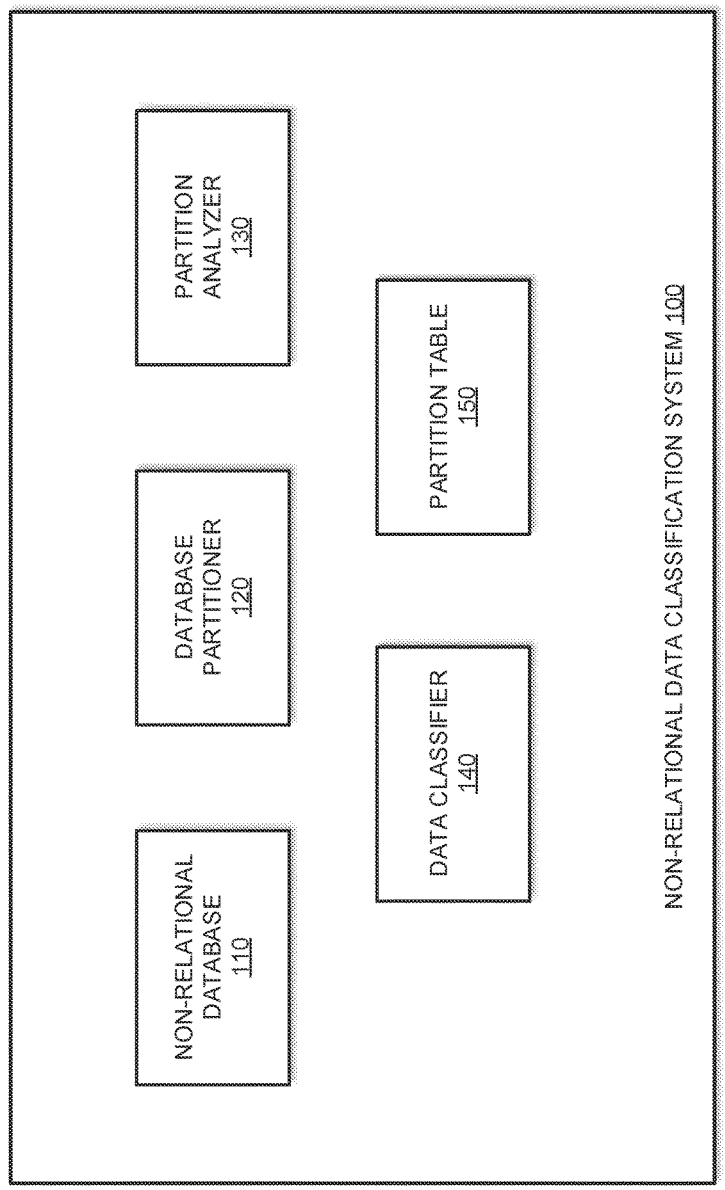
FIG. 1 is a block diagram illustrating an overall solution architecture used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to sensitive data classification, and more specifically, to classifying sensitive data stored in non-relational databases with potential memory limitations. While the present disclosure is not necessarily limited to such applications, various aspects of the disclosure may be appreciated through a discussion of various examples using this context.

Various laws, such as the General Data Protection Regulation (GDPR) and the California Consumer Privacy Act (CCPA), establish systems of accountability for the protection of sensitive data by creating rules, bodies, and responsibilities entrusted to certain specific actors in a market. Accountability requires compliance in implementing technical and organizational measures within a business. Data collectors, controllers, and processors can potentially be liable when data is inadvertently released, misused, or stolen.

Sensitive data can include information concerning an organization's or an affiliate's prospective, current, or former customers, clients, vendors, employees, or any other nonpublic business information. Sensitive data, as mentioned, is information whose disclosure is protected by law or regulation as well as organizational policies. This can include confidential information and personally identifiable information (PII), which can be an individual's name in conjunction with an identifier or account number and whose compromise could lead to identity theft or fraud.

PII can be any data that can be linked to an individual and, if released, could result in harm to the person. Examples of such information include social security numbers, passport numbers, biometric information, medical data, and personally identifiable financial information. Business information can relate to any data that would cause damage to a company if accessed by a competitor or the public. This can include financial data, trade secrets, supplier information, customer data, and the like.

Organizations can use databases to store and retrieve sensitive data. The databases can then be queried to create, update, delete, and retrieve the data. Relational databases typically store data in the form of tables that consist of rows and columns. The tables can have relationships with other tables to depict the actual data relationships. For example, a school may have a student table related to a course table. Prior to storing data in a relational database, the data is structured to match a schema to allow for information to be easily identified and retrieved.

Non-relational databases store unstructured and semi-structured data without enforcing a structure to the data before being stored. The data stored in non-relational databases can vary depending on the provider, but generally, data is stored as documents instead of tables. An example of this would be databases for inventory management, where different products have different attributes and, therefore, require a flexible structure. Similarly, an analytics database that stores data from different sources in different structures.

Limitations on storing sensitive data on non-relational databases remain, however, as sensitive data is not easily discovered and classified. Current data classifiers typically rely on database schemas. Since non-relational databases do not require strict adherence to schemas, the metadata of the stored information is not easily retrievable. Additionally, systems attempting to query large non-relational databases can experience memory constraints inhibiting the query process.

Embodiments of the present disclosure may overcome the above, and other problems, by using a non-relational data classification system to detect sensitive information in non-relational databases. The non-relational data classification system can partition a non-relational database into partitions that can be individually loaded into memory. Each document in each partition can then be analyzed to detect and record sensitive information. After a partition is analyzed, the memory of the system can be cleared to prevent memory limitations while searching for the sensitive information.

More specifically, the non-relational data classification system can partition a non-relational database into sizes loadable onto memory. Each partition is analyzed by iteratively analyzing each document in the partition and populating a structured table with metadata and data values located within the documents. After all of the documents have been analyzed and populated onto the table, data classification techniques can then be used on the table to detect the sensitive information. The sensitive information can then be recorded and the memory cleared to allow for the next partition to be searched.

In some embodiments, the non-relational data classification system generates statistics on the sensitive information detected within the non-relational database. For example, the statistics can include a hit percentage of sensitive information located within a document, partition, and/or the non-relational database. Additionally, the statistics can also include a confidence score relating to the sensitive information. The confidence score can reflect how confident the non-relational data classification system is regarding the detection of the sensitive information. A confidence score can be generated for each piece of sensitive information collected, for each document, each partition, and/or the entire non-relational database.

In some embodiments, the non-relational data classification system auto-populates missing metadata in documents with a null value. For example, some documents may contain some differing metadata, thereby leaving records empty for the metadata fields a document lack. If the record remains empty once a document is completed, the non-relational data classification system can populate those fields with a null value to prevent errors when performing data classification techniques on the table. In some embodiments, the non-relation data classification system auto-populates missing metadata from previously scanned documents. For example, a document being scanned may introduce new metadata that generates a new field within the table. A previously scanned document would then have a missing record for that newly generated field. In that event, the non-relation data classification system can auto-populate a null value for that previously scanned document.

In some embodiments, the non-relational data classification system retrieves sensitive information from documents embedded within a document. During the scan of a document, the metadata detected can be another document. If the metadata is another document, the non-relational data classification system can scan the embedded document for sensitive information. The process can continue until all embedded documents are scanned. Once the embedded document is scanned, the non-relational data classification system can proceed with scanning the original document for sensitive information. By doing so, all documents, regardless of whether they are embedded within another document or not, are scanned, and their corresponding metadata is populated onto the table.

In some embodiments, the non-relational data classification system partitions non-relational databases based on the characteristics of the databases. The characteristics include, for example, a maximum document size, the memory available to the non-relational data classification system for detecting sensitive information, and scenario sample sizes. The maximum document size can approximately determine the number of documents loadable onto memory at any given time. For example, if one hundred documents are loadable onto memory based on the maximum document size within the non-relational database, then the partition sizes can be set to one hundred documents per partition.

FIG. 1 is a block diagram illustrating a non-relational data classification system 100 is presented. The non-relational data classification system 100 includes a non-relational database 110, a database partitioner 120, a partition analyzer 130, a data classifier 140, and a partition table 150.

The non-relational database 110 is a component of the non-relational data classification system 100 configured to manage and maintain data and documents. The non-relational database may be implemented by one or more non-relational, i.e., non-SQL, types of database management systems. Examples of non-relational database management systems include MongoDB, Oracle, NoSQL, BaseX, Clusterpoint, eXist, Jackrabbit, OrientDB, Sedna, SimpleDB, and the like.

Each type of database management system organizes stored information differently than each other type. As a result, queries to each of the different types produce results with different content. For example, a query to a relational database, e.g., to a MySQL database, may return a field, i.e., an item of data. By contrast, a query to a document-oriented database, e.g., MongoDB, may return an object having a piece of data and instructions for what to do with the data. The object returned by MongoDB may be used to retrieve its associated data (which may be similar to the field returned by the relational database query). However, some translation and additional processing are typically needed in order to retrieve similar information from the different types of database management systems.

The database partitioner 120 is a component of the non-relational data classification system 100 configured to partition the non-relational database 110 into partitions. For example, a system with only two gigabytes of available memory may not be able to process all documents stored within the non-relational database 110. However, by partitioning the non-relational database 110 into partitions loadable onto the available memory, the classification process can proceed without encountering an out-of-memory error or the like.

The database partitioner 120 can scan different characteristics of the non-relational database 110 to determine the number of partitions. For example, the characteristics include, for example, a maximum document size, the memory available to the non-relational data classification system for detecting sensitive information, and scenario sample sizes. The maximum document size can approximately determine the number of documents loadable onto memory at any given time. For example, if one hundred documents are loadable onto memory based on the maximum document size within the non-relational database, then the partition sizes can be set to one hundred documents per partition. Despite an average document size being significantly smaller than the maximum document size, the partition count calculation can be based on the maximum document size to account for potentially wide variations of document sizes within a collection. This ensures that all data is scanned and analyzed to ensure that no sensitive data is missed.

In some embodiments, the database partitioner 120 partitions the non-relational database 110 by a fixed number of documents. For example, an administrator may set the partition size to one thousand documents per partition. If the non-relational database 110 contains 100,000 documents, then the database partitioner 120 can generate one hundred partitions. The predetermined number can be based on a number of factors such as the memory limitations of the system, the processing power of the system, the time needed to complete the sensitive information detection, and the like.

The partition analyzer 130 is a component of the non-relational database system 100 configured to populate and generate a partition table 150 using metadata taken from documents stored in each partition. In an iterative manner, the partition analyzer 130 can select a document from the documents stored within a first partition of the partitions generated by the database partitioner 120. The partition analyzer 130 can then proceed to detect the metadata within the document. Metadata includes, but not limited to, PII information, titles, descriptions, tags, categories, access times, medical information, names, addresses, and the like. In addition to finding the metadata, the partition analyzer 130 can detect the data values relating to the metadata. For example, the partition analyzer 130 can detect the metadata of a name. The corresponding data value of that name can be "John Doe." The partition analyzer 130 can perform this detection until all of the documents located within the partition are scanned.

The partition analyzer 130 is further configured to generate a partition table 150 and populate the partition table 150 with the metadata and the data values detected in the documents. The partition table can be structured to where each distinct piece of metadata detected in the documents corresponds to a field, and each document corresponds to a record. If the partition table 150 does not have a field for a new metadata entry, then the partition analyzer 130 can add that metadata as a new field in the partition table 150. For example, a first document can be detected as having metadata entries that include a name, an address, and a social security number. A second document can be detected as having the same metadata entries as the first document but also having a driver's license number as well. As such, the partition analyzer 130 can generate a driver's license number field in the partition table 150.

In some embodiments, the partition analyzer 130 auto-populates missing metadata in documents with a null value. For example, some documents may contain some differing metadata, thereby leaving fields in a record empty. If the field in a record remains empty once a document is completed, the non-relational data classification system can populate those fields with a null value to prevent errors when performing data classification techniques on the table.

In some embodiments, the partition analyzer 130 auto-populates missing metadata fields in records relating to previously scanned documents. For example, a document being scanned may introduce new metadata that generates a new field within the table. A previously scanned document would then not have a data value for that new field, leaving the record incomplete. In that event, the partition analyzer 130 can auto-populate a null value in the new field for that previously scanned document, thereby ensuring the record is complete.

The data classifier 140 is a component of the non-relational database system 100 configured to classify information stored on the partition table 150. The data classifier 140 can utilize various techniques to perform the classification of the information. These techniques include, but are not limited to, decision trees, rule-based methods, probabilistic methods, support vector machines "SVM" methods, instance-based methods, and machine learning techniques.

For example, in rule-based methods, the data classifier 140 determines the word patterns that are most likely to be related to sensitive information. A set of rules can be constructed, in which the left-hand side corresponds to a word pattern, and the right-hand side corresponds to a sensitive information classification label. In another example, the data classifier 140 can use machine learning techniques using a supervised learning approach where a set of training data records (i.e., records with known categories) are used to construct information. There are some variations of the basic problem formulation given above for text classification. In some embodiments, a particular label (e.g., sensitive, non-sensitive) is explicitly assigned to a record, whereas in other embodiments, a probability value, or confidence score, is assigned to the record.

It is noted that FIG. 1 is intended to depict the major representative components of an exemplary non-relational data classification system 100. In some embodiments, however, individual components may have greater or lesser complexity than as illustrated in FIG. 1, components other than or in addition to those illustrated in FIG. 1 can be present, and the number, type, and configuration of such components may vary.

Figure 2:
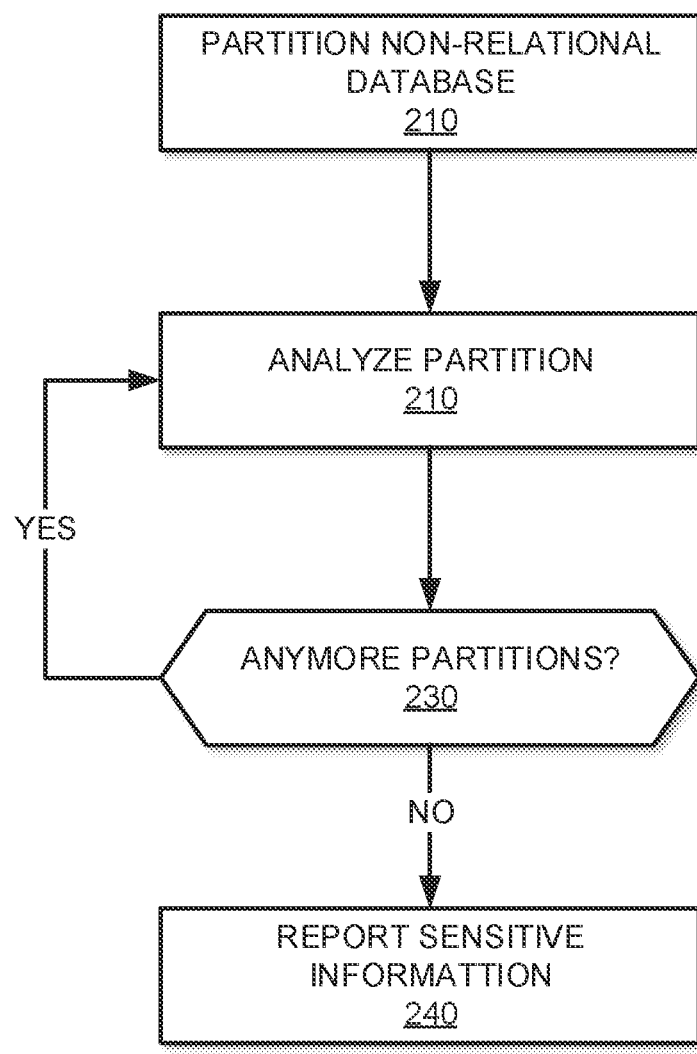
FIG. 2 is a flow diagram illustrating a process of detecting sensitive information in a non-relational database and performed in accordance with embodiments of the present disclosure.

FIG. 2 is a flow diagram illustrating a process 200 of detecting sensitive information in a non-relational database, in accordance with embodiments of the present disclosure. The process 200 can be performed by hardware, firmware, software executing on a processor, or a combination thereof. For example, any or all the steps of the process 200 may be performed by one or more processors embedded in a computing device.

The database partitioner 120 partitions the non-relational database 110 into a plurality of partitions. This is illustrated at step 210. The database partitioner 120 can scan different characteristics of the non-relational database 110 to determine the number of partitions. The characteristics include, for example, a maximum document size, the memory available to the non-relational data classification system for detecting sensitive information, and scenario sample sizes. For example, an administrator can set a default partition size of one hundred documents per partition. The database partitioner 120 can then partition the non-relational database 110 into partitions of that size. In another example, the database partitioner 120 can analyze the available memory and generate partitions that can be completely written onto the available memory.

The partition analyzer 130 analyzes documents in each partition for sensitive information. This is illustrated at step 220. The partition analyzer 130 can populate and generate a partition table 150 using metadata taken from documents stored in each partition. In an iterative manner, the partition analyzer 130 can select a document from the documents stored within a first partition of the partitions generated by the database partitioner 120. The partition analyzer 130 can then proceed to detect the metadata within the document. The analysis step 220 is discussed in greater detail with respect to FIGS. 3 and 4. After a partition is analyzed, the partition analyzer 130 can clear the memory of the system and check to see if another partition requires analysis. This is illustrated at step 230. If another partition requires analysis, the partition analyzer 130 can load the partition onto memory and reperform step 220 on the newly loaded partition.

However, if no partitions require analysis, then the partition analyzer 130 aggregates the sensitive information collected and generates a report of the sensitive information in the non-relational database 110. This is illustrated at step 240. The report can include various metrics and information regarding the location and type of sensitive information stored within the non-relational database 110. For example, the report can indicate that the fifth document in the fourth partition contains sensitive information regarding a person's medical history. The location and type can also be narrower or broader depending on the need of the administrator. For example, the location can be as narrow as indicating wherein a specific document the sensitive information is located or as broad as indicating the partition that includes the sensitive information.

The generated report can also include statistics regarding the sensitive information. The statistics can include a hit percentage indicating a percentage of documents that contain sensitive information as well as the number of partitions that contain sensitive information. Additionally, the statistics can include confidence scores relating to the sensitive information indication. For example, sensitive information can be detected in Document A and with a confidence score of 99% that indicates how confident the non-relational data classification system 100 is regarding the detection. The confidence score can also be based on the type of data classification technique used by the data classifier 140 when detecting the sensitive information.

Figure 3:
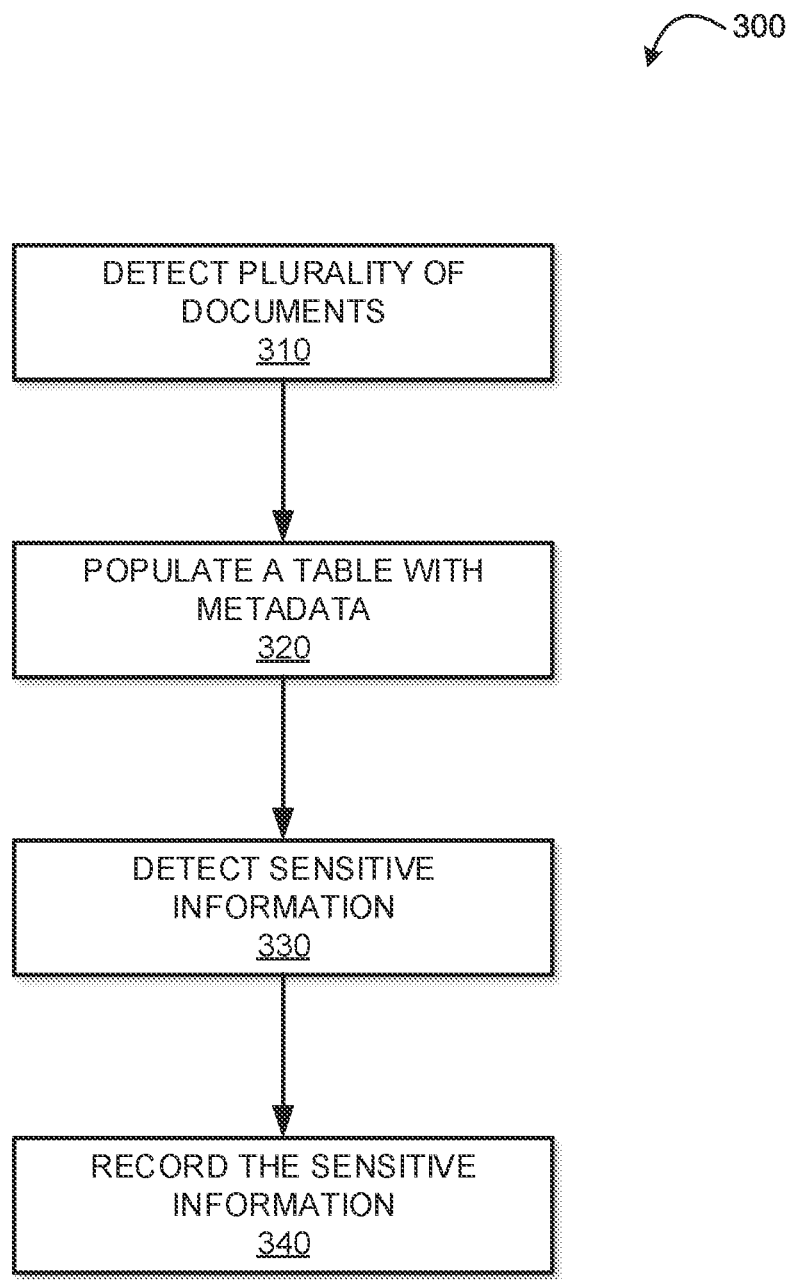
FIG. 3 is a flow diagram illustrating a process of analyzing a partition for sensitive information and performed in accordance with embodiments of the present disclosure.

FIG. 3 is a flow diagram illustrating a process 300 providing a more detailed description of step 210 for analyzing a partition for sensitive information, in accordance with embodiments of the present disclosure. The partition analyzer 130 detects a plurality of documents stored in a partition. This is illustrated at step 310. Each partition can store numerous documents contained within the non-relational database 110. In some embodiments, the partitions are generated by the database partitioner 120 based on a predetermined number of documents. For example, each partition can contain one hundred documents, one thousand documents, or some other amount. If so, the partition analyzer 130 can use the predetermined number set by an administrator to determine the number of documents within the partition. In some embodiments, the size of the partitions is based on an overall available memory size of a system performing the process 300. In that event, the partition analyzer 130 can scan the partition to detect the number of documents to be analyzed.

In an iterative manner, the partition analyzer 130 populates metadata from each document detected at step 310 onto a partition table 150. This is illustrated at step 320. The partition analyzer can scan each document for metadata and related data values to populate the partition table 150. The table can be structured to where each document is a record in the table, and each detected metadata type is a field in the table. The corresponding data values can be populated in fields related to the metadata. The step of populating the table is discussed in greater detail in FIG. 4.

The data classifier 140 detects sensitive information in the partition table 150. This is illustrated at step 330. The data classifier 140 can utilize various techniques to perform the classification of the information. These techniques include, but are not limited to, decision trees, rule-based methods, probabilistic methods, support vector machines "SVM" methods, instance-based methods, and machine learning techniques. The data classifier 140 can utilize these techniques to detect keywords or phrases in the partition table 150 and classify them. For example, the data classifier 140 can detect the data in the partition table 150 that includes specific personal information which is identified such as credit card details, home address, medical history, social security number, and other pieces of sensitive information.

The data classifier 140 can also note the location of the sensitive information. For example, if the data classifier 140 detects sensitive information populated in a metadata field, the data classifier 140 can mark the record and the field in which the sensitive information is detected. Additionally, if a particular data value is detected as sensitive information, the data classifier 140 can analyze other entries in that particular field as they can potentially be marked as being sensitive information as well. For example, a data value in Field A is detected as being a social security number. As such, the other entries in that field are also social security numbers and can be marked as sensitive information.

The data classifier 140 records the sensitive information detected in the partition table 150. This is illustrated at step 340. A record can be kept as to which documents contain sensitive information including, but not limited to, the location of the documents (e.g., which records in the table, and which partition), the type of sensitive information detected, the location of the sensitive information, the amount of sensitive information in each document, the overall amount of sensitive information in the partition table 150, and the like. The record can be updated and store the information relating to the detected sensitive information since the partition table 150 is cleared and new partition table 150 is generated for each partition being analyzed.

Figure 4:
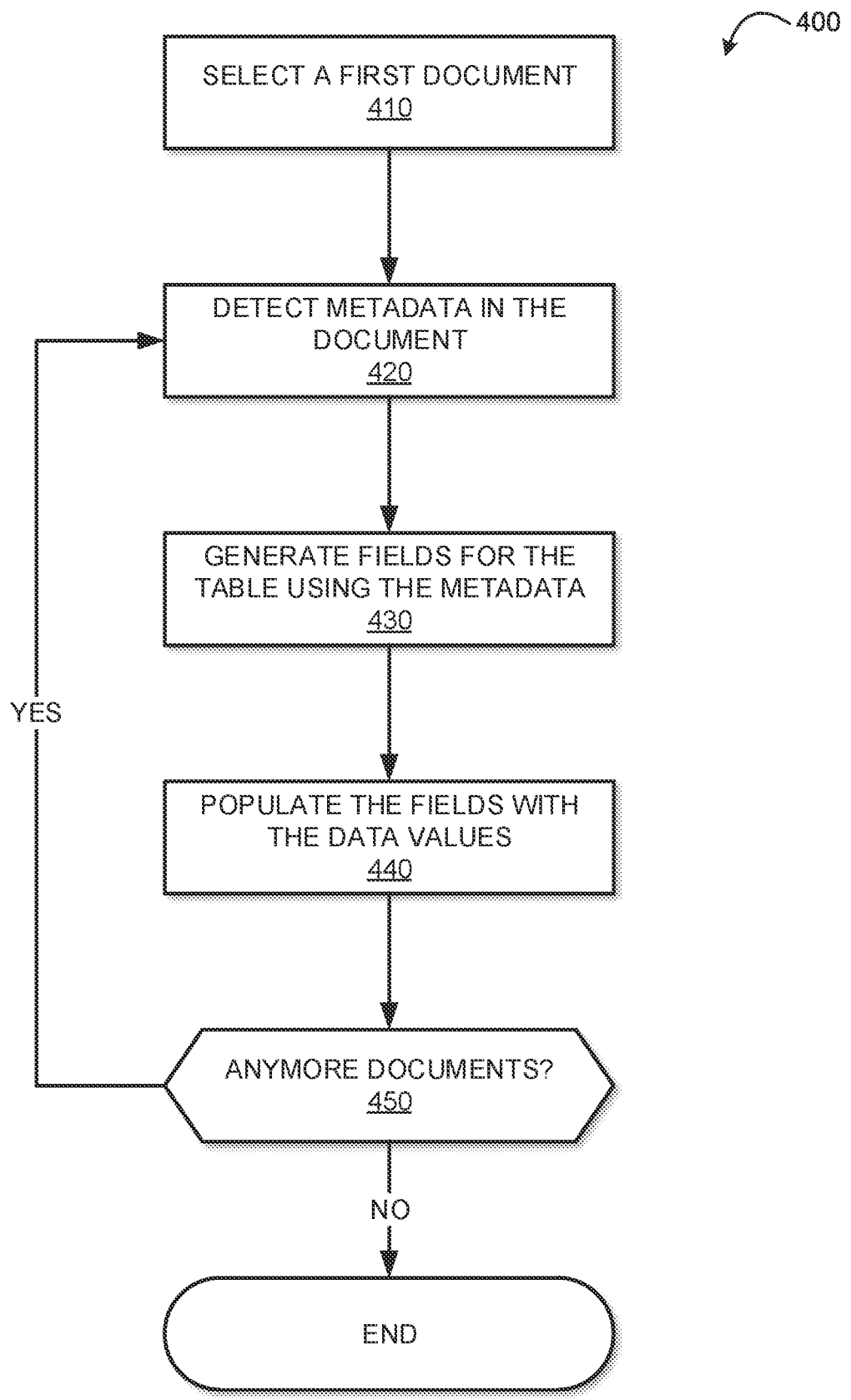
FIG. 4 is a flow diagram illustrating a process of populating a table with metadata extracted from documents in a partition and performed in accordance with embodiments of the present disclosure.

FIG. 4 is a flow diagram illustrating a process 400 providing a more detailed description of step 320 of populating a table with metadata extracted from documents in a partition, in accordance with embodiments of the present disclosure. The partition analyzer 130 selects a first document from the plurality of documents stored in a partition. This is illustrated at step 410. Each partition can store numerous documents contained within the non-relational database 110. In some embodiments, the partitions are generated by the database partitioner 120 based on a predetermined number of documents. For example, each partition can contain one hundred documents, one thousand documents, or some other amount. If so, the partition analyzer 130 can use the predetermined number set by an administrator to determine the number of documents within the partition. In some embodiments, the size of the partitions are based on an overall available memory size of a system performing the process 300. In that event, the partition analyzer 130 can scan the partition to detect the number of documents to be analyzed.

The partition analyzer 130 detects the metadata and corresponding data values in the first document. This is illustrated at step 420. Metadata includes, but not limited to, PII information, titles, descriptions, tags, categories, access times, medical information, names, addresses, and the like. In addition to finding the metadata, the partition analyzer 130 can detect the data values relating to the metadata. For example, the partition analyzer 130 can detect the metadata of a social security number. The corresponding data value of that name can be "111-11-1111".

The partition analyzer 130 generates a partition table 150 for the first document. This is illustrated at step 430. The partition table 150 can include records and fields. The records can represent the documents detected in the partition, and the fields can represent the metadata detected in the documents. The partition analyzer 130 can also populate the fields with the corresponding data values located in the documents. This is illustrated at step 440.

In some embodiments, the metadata is an embedded document. If the metadata is another document, the partition analyzer 130 can scan the embedded document for sensitive information and generate another record for the embedded document. Additionally, any new metadata types detected in the embedded document can also be added as fields. The process can continue until all embedded documents are scanned and the partition table 150 populated with their information. Once the embedded document is scanned, the partition analyzer 130 can proceed with scanning the first document for sensitive information. By doing so, all documents, regardless of whether they are embedded within another document or not, are scanned, and their corresponding metadata is populated onto the table.

In some embodiments, the partition analyzer 130 auto populates missing metadata in the first document with a null value. For example, some documents may contain some differing metadata, thereby leaving fields in a record empty. If the field in a record remains empty once a document is completed, the partition analyzer 130 can populate those fields with a null value to prevent errors when performing data classification techniques on the table.

In some embodiments, the partition analyzer 130 auto-populates missing metadata fields in records relating to previously scanned documents. For example, as the documents are being scanned in an iterative manner, later documents may introduce new metadata that generates a new field within the table. A previously scanned document (e.g., the first document) would then not have a data value for that new field, leaving the record incomplete. In that event, the partition analyzer 130 can auto-populate a null value in the new field for that previously scanned document, thereby ensuring the record is complete.

The partition analyzer 130 checks if there are any more documents in the partition that requires analysis and metadata detection. This is illustrated at step 450. If another document requires analysis, the partition analyzer 130 selects the next document and returns to step 420 to detect metadata within the next document and to populate the partition table 150. However, if all documents have been scanned, including any embedded documents, the process 400 is complete, and the partition table 150 can be scanned for any potentially sensitive information.

Figure 5:
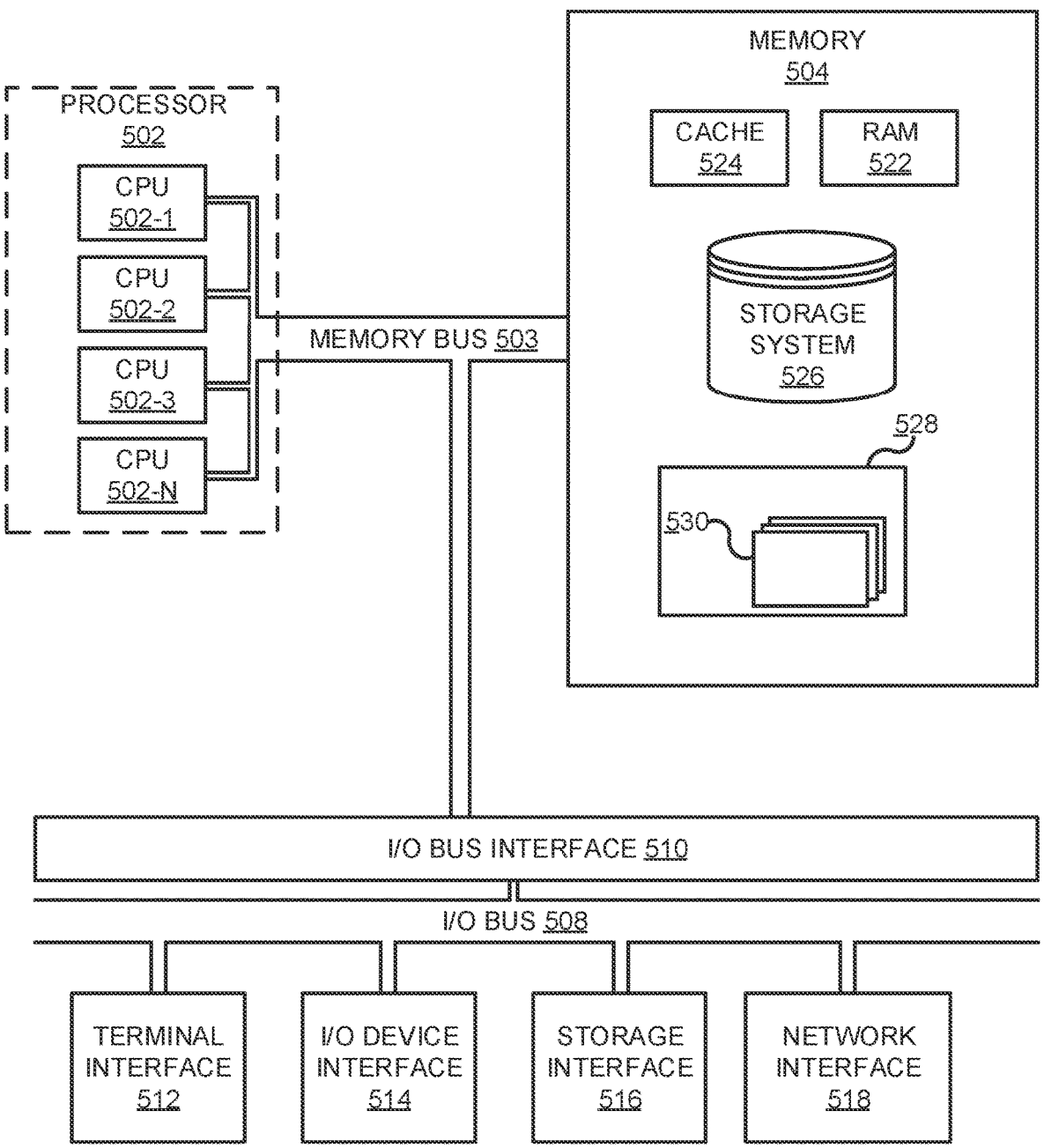
FIG. 5 is a high-level block diagram illustrating an example computer system that may be used in implementing one or more of the methods, tools, and modules, and any related functions, described herein in which the disclosure may be implemented.

Referring now to FIG. 5, shown is a high-level block diagram of an example computer system 500 (e.g., the non-relational data classification system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 502 may execute instructions stored in the memory 504 and may include one or more levels of onboard cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive.

Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments, some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the non-relational data classification system 100), may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of detecting sensitive information in a non-relational database, the computer-implemented method comprising:
    partitioning the non-relational database into a plurality of partitions that are based on characteristics relating to the non-relational database, wherein the characteristics include a maximum document size and an available memory, wherein respective partitions of the plurality of partitions are configured to store a number of documents corresponding to the available memory divided by the maximum document size;
    analyzing, by proceeding in an iterative manner with a first partition from the plurality of partitions;
        detecting a plurality of documents within the first partition containing metadata and data values;
        populating a table with the metadata representing fields and the data values relating to the metadata representing records;
        detecting sensitive information in the table using a data classification technique;
        recording the sensitive information;
        proceeding with a second partition acting as a next entry for a next iteration, until all partitions in the plurality of partitions are analyzed, wherein the second partition includes an embedded document that is scanned;
        adding a new field based on a new type of metadata in the embedded document of the second partition; and
        auto-populating, in response to adding the new field, a null value in the new field of the table representing the first partition;
    aggregating the sensitive information gathered from the partitions;
    generating statistics based on the sensitive information, wherein the statistics include a percentage of documents that contain the sensitive information, a number of partitions that contain the sensitive information, and a confidence score relating to the sensitive information and based on the data classification technique; and
    reporting the sensitive information and the statistics gathered from the plurality of partitions.

2. The computer-implemented method of claim 1, wherein populating the table comprises:
    selecting a first document, by proceeding in an iterative manner with the plurality of documents;
    detecting the metadata and the data values in the first document, wherein the first document is a first record in the table;
    generating the fields of the table with the metadata;
    populating the fields of the table with the data values corresponding to the metadata; and
    proceeding with a second document as a next entry for a next iteration, until all documents in the plurality of documents are selected.

3. The computer-implemented method of claim 1, wherein a memory on a system performing the computer-implemented method is released after each iteration.

4. The computer-implemented method of claim 1, wherein populating the table includes recording null values in blank fields within the table.

5. The computer-implemented method of claim 1, wherein reporting the sensitive information includes a location of the sensitive information and a type of the sensitive information.

6. The computer-implemented method of claim 1, wherein the characteristics further include a scenario sample size.

7. A computer program product for detecting sensitive information in a non-relational database, the computer program product including computer readable storage medium having computer executable instructions that when executed by at least one computer cause the at least one computer to execute the computer executable instructions to:
    partition the non-relational database into a plurality of partitions that are based on characteristics relating to the non-relational database, wherein the characteristics include a maximum document size and an available memory, wherein respective partitions of the plurality of partitions are configured to store a number of documents corresponding to the available memory divided by the maximum document size;
    analyze, by proceeding in an iterative manner with a first partition from the plurality of partitions;
    detect a plurality of documents within the first partition containing metadata and data values;
    populate a table with the metadata representing fields and the data values relating to the metadata representing records;
    detect sensitive information in the table using a data classification technique;
    record the sensitive information;
    proceed with a second partition acting as a next entry for a next iteration, until all partitions in the plurality of partitions are analyzed, wherein the second partition includes an embedded document that is scanned;
    add a new field based on a new type of metadata in the embedded document of the second partition; and auto-populate, in response to adding the new field, a null value in the new field of the table representing the first partition;
    aggregate the sensitive information gathered from the partitions;
    generate statistics based on the sensitive information, wherein the statistics include a percentage of documents that contain the sensitive information, a number of partitions that contain the sensitive information, and a confidence score relating to the sensitive information and based on the data classification technique; and
    report the sensitive information and the statistics gathered from the plurality of partitions.

8. The computer program product of claim 7, wherein the computer executable instructions to populate the table comprise additional computer executable instructions to:
    select a first document, by proceeding in an iterative manner the plurality of documents;
    detect the metadata and the data values in the first document, wherein the first document is a first record in the table;
    generate the fields of the table with the metadata;
    populate the fields of the table with the data values corresponding to the metadata; and proceed with a second document as a next entry for a next iteration, until all documents in the plurality of documents are selected.

9. The computer program product of claim 7, wherein a memory on a system implementing the computer executable instructions is released after each iteration.

10. The computer program product of claim 7, wherein populating the table includes recording null values in blank fields within the table.

11. The computer program product of claim 7, wherein reporting the sensitive information includes a location of the sensitive information and a type of the sensitive information.

12. The computer program product of claim 7, wherein the characteristics further include a scenario sample size.

13. A system for detecting sensitive information in a non-relational database, the system comprising:
  a memory;
  a processor;
  local data storage having stored thereon computer executable code, wherein the computer executable code includes program instructions executable by the processor to cause the processor to perform a method, the method comprising:
  partitioning the non-relational database into a plurality of partitions that are based characteristics relating to the non-relational database, wherein the characteristics include a maximum document size and an available memory, wherein respective partitions of the plurality of partitions are configured to store a number of documents corresponding to the available memory divided by the maximum document size;
  analyzing, by proceeding in an iterative manner with a first partition from the plurality of partitions,
    detecting a plurality of documents within the first partition containing metadata and data values,
    populating a table with the metadata representing fields and the data values relating to the metadata representing records,
    detecting sensitive information in the table using a data classification technique,
    recording the sensitive information, and
    proceeding with a second partition acting as a next entry for a next iteration, until all partitions in the plurality of partitions are analyzed, wherein the second partition includes an embedded document that is scanned; and
    adding a new field based on a new type of metadata in the embedded document of the second partition; and
    auto-populating, in response to adding the new field, a null value in the new field of the table representing the first partition;
  aggregating the sensitive information gathered from the partitions;
  generating statistics based on the sensitive information, wherein the statistics include a percentage of documents that contain the sensitive information, a number of partitions that contain the sensitive information, and a confidence score relating to the sensitive information and based on the data classification technique; and
  reporting the sensitive information gathered from the plurality of partitions.

14. The system of claim 13, wherein the computer executable code for populating the table comprises additional program instructions to cause the processor to perform the method further comprising:
  selecting a first document, by proceeding in an iterative manner with the plurality of documents;
  detecting the metadata and the data values in the first document, wherein the first document is a first record in the table;
  generating the fields of the table with the metadata;
  populating the fields of the table with the data values corresponding to the metadata; and
  proceeding with a second document as a next entry for a next iteration, until all documents in the plurality of documents are selected.

15. The system of claim 13, wherein the memory on the system implementing the computer executable code is released after each iteration.

16. The system of claim 13, wherein populating the table includes recording null values in blank fields within the table.

17. The system of claim 13, wherein reporting the sensitive information includes a location of the sensitive information and a type of the sensitive information.

18. The system of claim 13, wherein the characteristics further include a scenario sample size.

* * * * *